United States Patent [19]

Swann et al.

[11] Patent Number: 5,584,463

[45] Date of Patent: Dec. 17, 1996

[54] RADIAL VIBRATION DAMPING ARRANGEMENT

[75] Inventors: Michael K. Swann, Gales Ferry; Richard R. Shultz, Groton, both of Conn.

[73] Assignee: Glacier RPB Inc., Mystic, Conn.

[21] Appl. No.: 293,920

[22] Filed: Sep. 29, 1994

[51] Int. Cl.$^6$ .................................................. F16C 39/06
[52] U.S. Cl. ............................ 248/636; 267/113; 384/99
[58] Field of Search .......................... 384/99, 100, 117, 384/119; 267/113; 248/636

[56] References Cited

U.S. PATENT DOCUMENTS

| | | |
|---|---|---|
| 2,884,282 | 4/1959 | Sixsmith . |
| 3,271,086 | 9/1966 | Deffrenne . |
| 3,442,560 | 5/1969 | Gast . |
| 3,697,142 | 10/1972 | Fortier . |

FOREIGN PATENT DOCUMENTS

| | | |
|---|---|---|
| 0099180 | 1/1984 | European Pat. Off. . |
| WO94/16251 | 7/1994 | WIPO . |

OTHER PUBLICATIONS

NTIS Tech Notes, p. 25, "Damping Seals Would Help Support Turbopump Rotor" (1992).

Primary Examiner—Lenard A. Footland
Attorney, Agent, or Firm—Nixon & Vanderhye

[57] ABSTRACT

A damping arrangement 20 (FIG. 1(b)) for radial vibrations in a turbomachine shaft 10 comprise two circumferentially limited, diametrically opposed damping chambers 22, 23 open towards the shaft and to which gas is supplied alternately by gas flow controllers $29_A$ and $29_B$. Each controller contains fluidic devices switched by sensing pressures in the circumferentially displaced chambers 22', 23', or even the same chambers, as such pressure are modulated by the variations in shaft position, to divert the gas from source 27. The diversion of gas flow is arranged to cause pressure fluctuations, which exert radial thrust on the shaft, advanced in phase to approach of the shaft so as to damp the vibration. The fluidic devices may be implemented by flow amplifiers or fluid logic flip flop 41 (FIG. 2) and may be multistage devices to increase gain, all of which may be formed without moving parts and embedded in the housing. Flow diversion may be effected by other forms of sensing, such as leakage from a nozzle facing the shaft. The arrangement may be combined with, or serve as, a gas seal or be part of a bearing arrangement.

23 Claims, 5 Drawing Sheets

RADIAL VIBRATION DAMPING ARRANGEMENT

This invention relates to a damping arrangement for a rotor shaft and is particularly applicable to damping vibration of a shaft rotatable at high speeds, for example, in turbomachinery. The invention is concerned with radial vibrations, that is in directions orthogonal to the axis of rotation of the shaft.

Such radial vibrations comprise periodic displacement of the rotational axis of the shaft and as a result of the rotation the rotational axis tends to orbit the nominal or static axis at the rate of rotation of the shaft about the rotational axis or an integral or non-integral function thereof, depending upon the source of vibration and any other damping effects associated with the shaft and its suspension.

In high speed machinery such vibrational rotations may therefore occur within specific frequency ranges (which may extend indefinitely above a threshold frequency) which render the machinery unstable, notwithstanding any inherent damping performed by bearings supporting the shaft with respect to a housing. Furthermore, bearing types frequently employed in such high speed machinery, such as magnetic bearings and hydrostatic bearings have poor inherent damping capability against vibrations which may occur even at relatively low speeds, and notwithstanding bearing structure it is difficult to rely upon bearing structure alone if such bearings have to be positioned remotely from positions where damping forces they generate can usefully be applied to a shaft.

In heavy shafts rotating at high speed the forces transversely to the longitudinal axis generated by such vibrations are of significant magnitude and forces of a similar order of magnitude are required to effect an adequate degree of vibrational damping.

It is an object of the present invention to provide for a rotatable supported shaft a radial vibration damping arrangement of simple construction and the ability to provide significant damping force.

Such a damping arrangement may be provided on its own or combined with other functional structures, and it is also an object of the invention to provide a radial vibration damping arrangement which utilises the structure of a gas seal associated with the shaft and/or cooling gas passed along the shaft.

It will be appreciated that whereas such vibrational reciprocation of a rotating shaft axis may be confined to a single plane extending through the axis of rotation, such as a vertical plane, or may occur in any plane or precess between planes the rotation of the shaft effectively results in vibrational components of the shaft in all planes through its axis of rotation and the damping arrangement may be constructed with an appropriate degree of complexity to accommodate the nature of the radial vibrations to be damped.

In accordance with this invention a radial vibration damping arrangement for a rotor shaft extending through a housing and spaced therefrom by a clearance comprises damping chamber means defined in the housing comprising at least one damping chamber open towards the shaft and partially surrounding the shaft between bounding walls, at least one supply of gas at elevated pressure, gas duct means opening into each said chamber and gas flow control means operable to provide a positive pressure within the damping chamber means acting radially on the shaft and comprising, for each damping chamber, a flow controller responsive to reciprocation of the shaft to and from the housing to modulate the supply of gas to the damping chamber by way of the duct means, and thus the pressure therein, at the same frequency as the shaft reciprocation and advanced in phase with respect to variations in shaft position relative to the chamber within a predetermined frequency range to effect a corresponding variation in radial thrust on the shaft and damping of said shaft radial reciprocation.

The damping arrangement may be integrated into the structure of a bearing of the shaft, within a gas seal structure or comprise a discrete item.

Embodiments of the invention will now be described by way of example with reference to the accompanying drawings, in which.

Figure 1A:
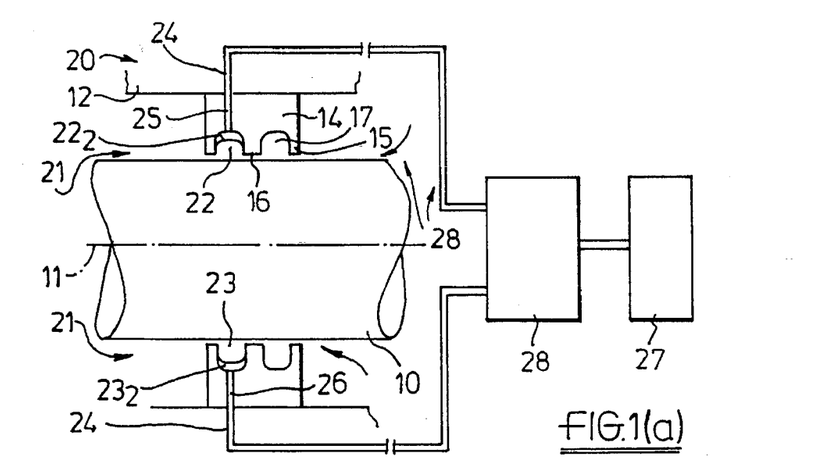
FIG. 1(a) is a sectional elevation through a rotatable shaft supported with respect to a housing and a portion of a labyrinth gas seal therefor incorporating a radial vibration damping arrangement in accordance with the present invention illustrating the major components thereof.
Figure 1B:
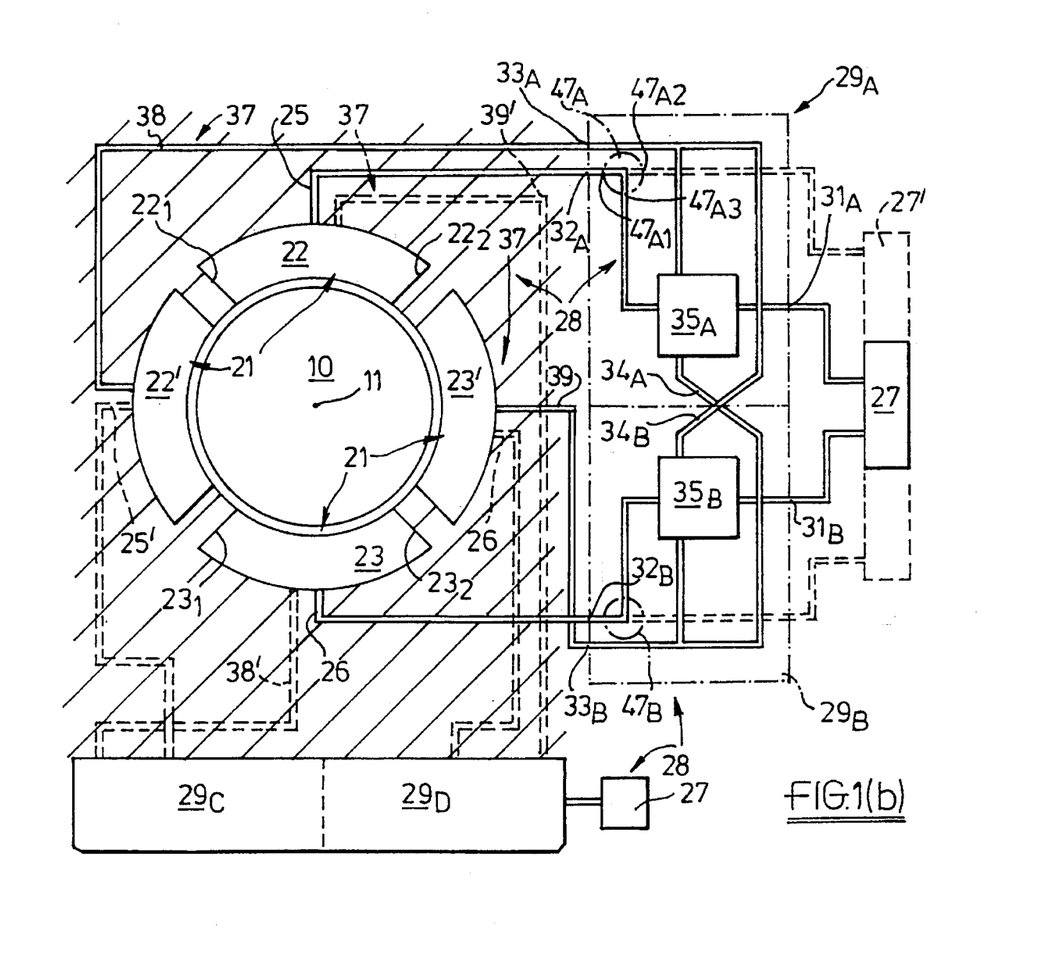
FIG. 1(b) is a cross-sectional elevation through the shaft and damping chambers of FIG. 1(a) and illustrating the gas glow control means in a greater degree of detail, including the disposition and interconnection between the damping chambers, a first form of shaft displacement feedback means providing pressure feedback from the damping chambers and individual active gas flow controllers one pair associated with a pair of damping chambers being shown in detail in a first form comprising self-powered fluidic proportional devices.

Referring to FIGS. 1(a) and 1(b), a shaft 10 of a machine, such as a turbomachine, is caused to rotate about its longitudinal axis 11 at high speed by drive means not shown. The shaft is supported with respect to a housing 12 by bearing means, also not shown. Gas pressure within the housing is usually above ambient pressure and a labyrinth gas seal, shown generally at 14, is provided to effect a controlled escape of gas by way of a limited clearance between the shaft and housing. The escape of gas is not altogether undesirable and frequently is employed for cooling components, such as bearings, through which it passes.

Such a labyrinth gas seal typically comprises one or more lips 15, 16, which have minimal clearance from the shaft surface separated axially by a series of annular chambers, such as 17, the shapes and dimensions of the chambers and passages joining them causing the gas to flow through a tortuous and energy dissipating path which provides the flow limiting, that is, sealing, effect.

As is well known in high speed, and particularly turbo-,machines, high rotation rates tend to be accompanied by radial shaft vibrations, often at substantially the same rate and which exist in one or more planes through the rotational axis, which causes the rotational axis of the shaft to become displaced from and orbit about, the longitudinal axis of the housing; the variations in axial gas flow created thereby at particular positions about the shaft may be such that gas flow both to and from the chambers is excessive and reverse flow conditions may be induced, leading to negative stiffness and/or negative damping.

In accordance with the invention a vibration damping arrangement indicated generally at 20 comprises, in the housing and surrounding the shaft, damping chamber means 21. The damping chamber means comprises two pairs of damping chambers 22 and 23 and 22' and 23' arrayed about the shaft in oppositely disposed pairs, each chamber being open towards the shaft and partially surrounding it between bounding walls $22_1$, $22_2$ and $23_1$, $23_3$ respectively. The damping chambers are conveniently in the same plane and each subtending an angle of about 90 degrees at the axis.

The arrangement further comprises gas duct means 24 opening into each damping chamber, in the form of ducts 25 and 26 (and 25' and 26', FIG. 1(b)), a gas supply 27 and gas flow control means indicated generally at 28.

From FIG. 1(b) it can be seen that the gas flow control means comprises a corresponding number of gas flow controllers $29_A$ to $29_D$ associated individually with the four damping chambers. Considering controllers $29_A$ and $29_B$ and the associated chambers 22 and 23 respectively as representative, a first controller form is shown in greater detail. For gas flow controller $29_A$, it has an input port $31_A$ connected to gas supply 27, an output port $32_A$ connected to the gas duct means 25 and a control input port $33_A$ and control input port $34_A$. The controller contains a self-powered fluidic device $35_A$ and the control inputs $33_A$ and $34_A$ are ports which respond to gas pressure to control the flow of gas between input and output ports $31_A$ and $32_A$ at a rate and pressure that represents a gain factor greater than one.

The controller $29_B$ is of corresponding form and parts corresponding to those of controller $29_A$ are indicated with a reference subscript 'B'. Controllers $29_C$ and $29_D$ are likewise of corresponding form but not shown in detail.

The gas flow control means also comprises shaft displacement feedback means indicated generally at 37 and comprising, for each damping chamber 22 or 23, means to provide a feedback signal related to gas pressure in sensing chamber means, including at least one pressure sensing chamber circumferentially displaced from the respective damping chamber in advance thereof in the direction of shaft rotation, that is, in the direction opposite to that in which the shaft rotates. For damping chamber 22 and associated controller $29_A$ the feedback means comprises a pressure sensing chamber formed by damping chamber 22' and a feedback duct 38 extending between chamber 22' and the control input port $33_A$. In addition, the sensing chamber means comprises a further sensing chamber, formed by the damping chamber 23' which is disposed circumferentially after the damping chamber 22 and in advance of damping chamber 23, and a feedback duct 39 extending between the chamber 23' and the control input port $34_A$ of controller $35_A$.

In respect of controller $29_B$ the shaft displacement means comprises a sensing chamber formed by the damping chamber 23' displaced circumferentially in advance of the chamber 23 and the feedback duct 29 extending between chamber 23' and control input $33_B$ and, in addition, the damping chamber 22' displaced circumferentially after chamber 23 and the feedback duct 38 extending between the further sensing chamber formed by chamber 22' and the control input port $34_B$.

It is convenient for clarity to refer to any chamber to which gas is supplied in any particular operational configuration as being a "damping chamber" and any whose pressure is sensed for feedback to control that supply as being a "sensing chamber", notwithstanding that the such sensing chamber may also act at different times as a damping chamber and vice versa.

Considering operation of the damping arrangement as it involves the controller $29_A$, if the shaft 10 in rotating about axis 11 begins to vibrate such that its axis reciprocates to and from the housing chambers as it rotates, the pressure in the sensing chamber 22' is modulated by the distance between the shaft and the chamber and rises and falls by a limited amount in synchronism with the shaft vibration. The pressure variation in sensing chamber 22' is conveyed by feedback duct 38 to control input $33_A$. The further sensing chamber 23' likewise responds to reciprocation of the shaft position by exhibiting a pressure modulation 180 degrees out of phase with sensing chamber 22', conveyed by duct 39 to the controller $29_A$ at $34_A$.

Controller $29_A$ is switched as to its gas conduction by one or both of said pressures, indicative of a pressure rise in sensing chamber 22' and pressure fall in sensing chamber 23', to supply gas to damping chamber 22 through duct 25, the effect of which is to further increase the pressure and exert a radially directed force on the shaft which tends to drive it towards the damping chamber 23.

A short time later, as the shaft reciprocation tends to raise the pressure in sensing chamber 23' and reduce it in sensing chamber 22' shaft displacement feedback means returns a pressure rise to control input $34_A$ of the controller to inhibit the gas supply to damping chamber 22 and permit the pressure therein to fall by leakage.

It will be appreciated that once a vibrational shaft disturbance has begun which results in sensing chamber pressure variations at the vibration frequency and the controller $29_A$ being operated, the gas supply to the damping chamber 22 is switched on and off at the same frequency as the vibration to exert by way of the periodically increased pressure in damping chamber 22 a radially directed periodic thrust on the shaft. Furthermore the periodic supply of gas at elevated pressure to each damping chamber can be at such a rate to ensure that the pressure therein remains elevated with respect to ambient pressure, notwithstanding leakage from the chamber.

In responding to detection of a pressure increase in sensing chamber 22' in advance of the shaft approaching damping chamber 22 associated with the controller $29_A$, the controller response, gas flow rate and supply pressure can be configured to provide the pressure increase in chamber 22 advanced in phase with respect to the shaft approach thereto by a predetermined amount and thus act to damp the vibration of the shaft.

It will be appreciated that the degree of damping is dependent not only upon the pressure of gas supplied but also upon the degree of phase advance with respect to the shaft being closest to the damping chamber. The angular extent of less than 90 degrees of sensing chamber 22' which provides feedback to the controller, due to it being in the same form of chambers 22 and 23 also a damping chamber of corresponding circumferential extent, limits the maximum phase advance to approximately 135 degrees of the shaft being aligned with the centre of chamber 22, although by introducing a suitable delay, the minimum phase advance may be reduced to almost 0 degrees.

Preferably, to give optimal damping at a particular vibration frequency whilst being effective at other frequencies, a phase advance of approximately 90 degrees with respect to shaft position is defined by choice of any or all of the rate of gas supply, triggering threshold(s) of the gas flow control means and the pressure of source 27.

It will be seen that as such a vibration is opposed and damped by varying the supply of gas to chamber 22 by controller $29_A$, the gas flow controller $29_B$ is switched out of phase with controller $29_A$ by the same feedback signals oppositely supplied to its control inputs and delivers gas to chamber 23 also in advance of the shaft approach, thereby contributing equally or additionally to the vibration damping effect at least in one or more planes containing the damping chambers 22 and 23.

It will be appreciated that as the increase and subsequent decrease in pressure in any damping chamber occurs over a finite period of time in damping chambers of significant circumferential extent, damping forces are exerted on the shaft over a range of angular positions thereof.

As indicated above the damping chambers 22' and 23' are likewise supplied with gas by way of duct means 25' and 26' from controllers $29_C$ and $29_D$ respectively, which in turn are switched in response to detecting pressure variations by way of feedback ducts 38' and 39' respectively in the chambers 22 and 23 and which act as pressure sensing chambers therefor in addition to acting as damping chambers associated with controllers $29_A$ and $29_B$.

That is, as the shaft axis is displaced in each of four orthogonal directions its displacement is opposed by a damping chamber pressure increased to any chosen significant degree above ambient pressure by supply 27, the combined effects from the individual damping chambers, which effects may overlap in time and angular extent, providing an effective damping in all radial directions with respect to the longitudinal axis.

The active and self-powered gas flow controllers $29_A$ and $29_B$ may be provided by proportional flow devices which respond to the pressure changes sensed at the control inputs to vary gas flows at high slew rates consistent with a switching or flip flop flow diverting effect between the two controllers.

It will be appreciated that whereas it is convenient to stop the flow from controller device $35_A$ by the same pressure feedback signal which triggers device $35_B$ into conduction, and vice versa, the fluid flow may be stopped only after the other device begins to increase flow by coupling the control inputs $34_A$ and $34_B$ to the output ports of the other device or $32_A$, $32_B$ of the controllers.

Thus, in the form shown in FIG. 1(b) the flow controllers $29_A$ and $29_B$ associated with opposite pairs of damping chambers by both responding to the same chamber pressure signals operate in unison to divert the flow from one damping chamber to the other alternately.

Figure 2:
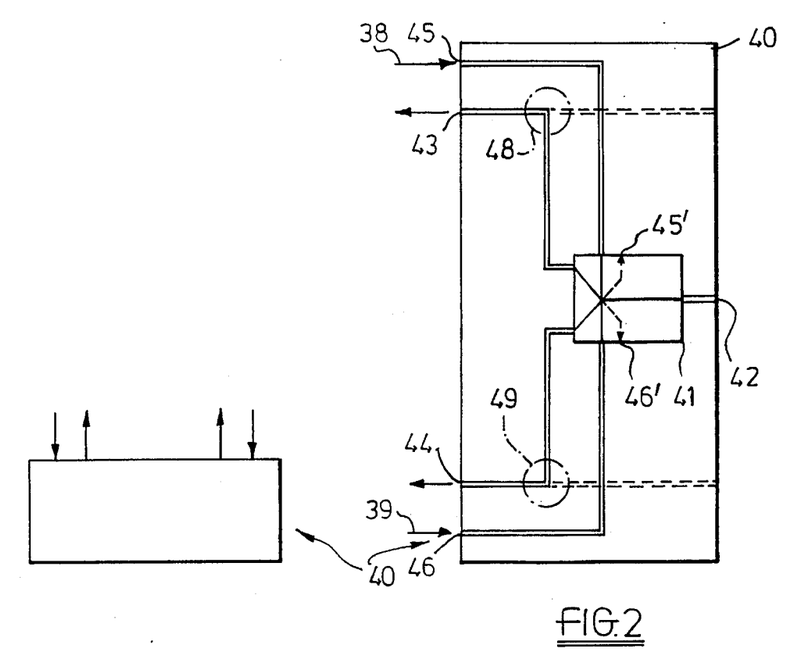
FIG. 2 is a schematic circuit diagram of a pair of gas controllers of FIG. 1(b) of a second form each associated with one of a pair of oppositely disposed damping chambers comprising a single stage self-powered fluid logic flip flop device.

An alternative form of damping arrangement, generally similar to that shown in FIG. 1(b), has gas flow control means comprising the same form of shaft displacement feedback means but pairs of gas flow controllers, associated with opposite pairs of damping chambers, taking different forms and one of which, corresponding to controller pair $29_A$ and $29_B$, is shown at 40 in FIG. 2. The chambers 22 and 23 have associated therewith gas flow controllers in the form of a common self-powered gas flow diverter comprising a fluid logic flip flop 41 having an input port 42 connected to gas source 27 and two output ports 43 and 44 connected to the damping chamber ducts 25 and 26 respectively. The flip flop also has two trigger ports 45 and 46 which provide control inputs arranged to receive signals from the shaft displacement feedback means 37 (FIG. 1(b)) related to pressures and coupled to the sensing chamber 22' or 23' by ducts 38 and 39 respectively. In operation the periodic chamber pressures sensed by the ducts 38 and 39 alternately direct the flow of gas through the diverter such that it is diverted between, or alternately fed to, the damping chambers 22 and 23 in the same manner as described above. In operation of such a fluidic device, switching between states may require that one control input port is vented. If appearance of high pressure at one control input is not accompanied by sufficiently low pressure at the other to effect venting, then separate vents, indicated by ghosted lines 45' and 46' may be employed.

It will be appreciated that the radially directed thrusts which result from the periodic forced increases in damping chamber pressure are less than the vibration producing forces in order to constitute damping forces, and not sources, of vibration in their own rights, and to this end the pressure and/or rate of gas supplied by the source 27 may be separately controlled (not shown) in accordance with a separate measure of the amplitude of shaft vibration. However, it will be appreciated that when such shaft vibrations occur at a frequency rate that may be consistent with high rotation rate of a turbomachine shaft of large rotating mass it is necessary to combine a fast response to chamber pressure changes in accordance with the shaft rotation rate with supply of gas at sufficient rate and/or pressure to produce a significant radial retarding force against the shaft to effect damping.

As the gain of any such self-powered fluidic devices currently available is, in practice, limited each controller may require to have means for boosting the output of a single stage fluidic device and/or comprise a multi-stage or tandem connection or such fluidic devices as master and slave devices.

If the modulated gas flow available from either of the above described forms of gas flow controllers is insufficient each such gas flow controller may have in line with its associated damping chamber a flow inductor as shown ghosted at $47_A$ and $47_B$ in FIG. 1(b) or as 48 and 49 in FIG. 2.

Referring to FIG. 1(b), in line with the duct means 25 associated with chamber 22 and controller device $35_A$ a flow inductor $47_A$, known per se, has an inductor output port $47_{A1}$ coupled to the chamber duct means 25 by way of controller output port $32_A$, an inductor main input port $47_{A2}$ coupled to a gas supply 27', conveniently, but not necessarily, the gas supply 27, and an inductor control input port $47_{A3}$ to receive the modulated gas flow from the device $35_A$. The flow inductor in known manner combines the gas flows at the inductor input ports and provides at the inductor output port a boosted gas flow modulated in accordance with the modulation at the inductor control input port.

It will be seen from FIG. 2 that corresponding flow inductors 48 and 49 may be associated with each output port 43 and 44 respectively of the flow diverter flip flop 41.

Alternatively, or additionally, to the use of such flow inductor or the like to boost the modulated supply of gas to the damping chamber means, each active gas flow controller $29_A$, $29_B$, 40 etc. may comprise a multistage arrangement, that is comprise a plurality of flow control devices connected in tandem or cascade, the plurality comprising a master device and one, or possibly more than one, slave device to boost the modulation supply of gas to the damping chamber.

Figure 3A:
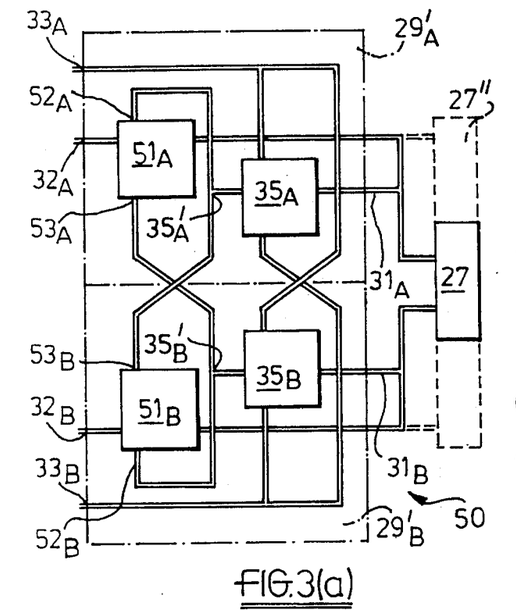
FIG. 3(a) is a schematic circuit diagram of a pair of gas controllers of a third form comprising a multistage arrangement of the devices of FIG. 1(a)

Referring to FIG. 3(a) this shows in semi-schematic form a third embodiment 50 of the controller pair associated with damping chambers 22 and 23 and corresponding to controller pair $29_A$ and $29_B$. Again, many of the parts correspond to those shown and described in relation to FIG. 1(b) and are given like reference numbers. The gas flow controllers are identified as $29'_A$ and $29'_B$. The gas flow controller $29'_A$ comprises the aforementioned fluidic device $35_A$ which provides a master device and at least one slave device $51_A$ of similar form, each device having input, output and control ports. The master device has its input and control ports connected to the controller ports $31_A$, $32_A$ and $33_A$ as described above. The slave device $51_A$ has its input port connected to the controller input port $31_A$ (or possibly directly to a different supply shown ghosted as 27") and its output port connected to the controller output port $32_A$. The output port $35'_A$ of the master device is connected to a control input port $52_A$ of the above device $51_A$. The controller $29'_B$ has both master and slave devices identified by reference subscripts 'B'; the output port $35'_B$ of master device $35_B$ is coupled to the control input $52_B$ of slave device $51_B$ and to control input $53_A$ of slave device $51_A$. Likewise, the output port $35'_A$ of master device $35_A$ is also connected to control input $53_B$ of slave device $51_B$. It will be appreciated that operation is substantially as described for controllers $29_A$ and $29_B$ except that overall gain of the each active controller is increased.

Figure 3B:
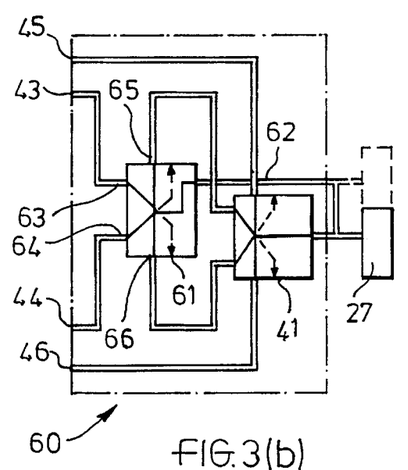
FIG. 3(b) is a schematic circuit diagram of a pair of gas controllers of a fourth form comprising a multistage arrangement of the device of FIG. 2, FIGS. 4(a) and 4(b) are sectional and cross-sectional elevations respectively through the shaft and damping chamber arrangements of FIGS. 1(a) and 1(b) illustrating a second form of shaft displacement feedback means.

It will also be appreciated that as the separate controllers may be contained within a single flow diverting device, such as the fluid flip flop 41 shown in FIG. 2, a multistage controller may include master and slave devices the slave devices likewise be combined as shown on the fourth form 60 illustrated in FIG. 3(b). The controller includes a master flip flop 41 and a slave flip flop 61 having an input port 62 connected to the supply 27 (or alternative 27"), dual output ports 63 and 64 which are connected to the controller output ports 43 and 44 and supply fluid to the damping chambers 22 and 23 alternately as switched by the supply of fluid on alternate output ports of control flip flop 41 that are connected to the control inputs 65, 66 of the slave device.

Figure 4A:
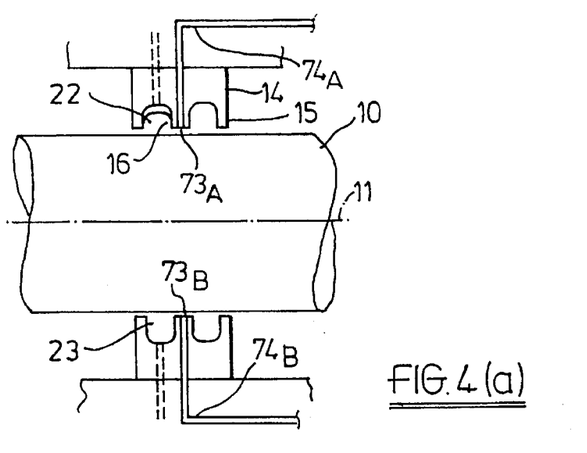
Figure 4B:
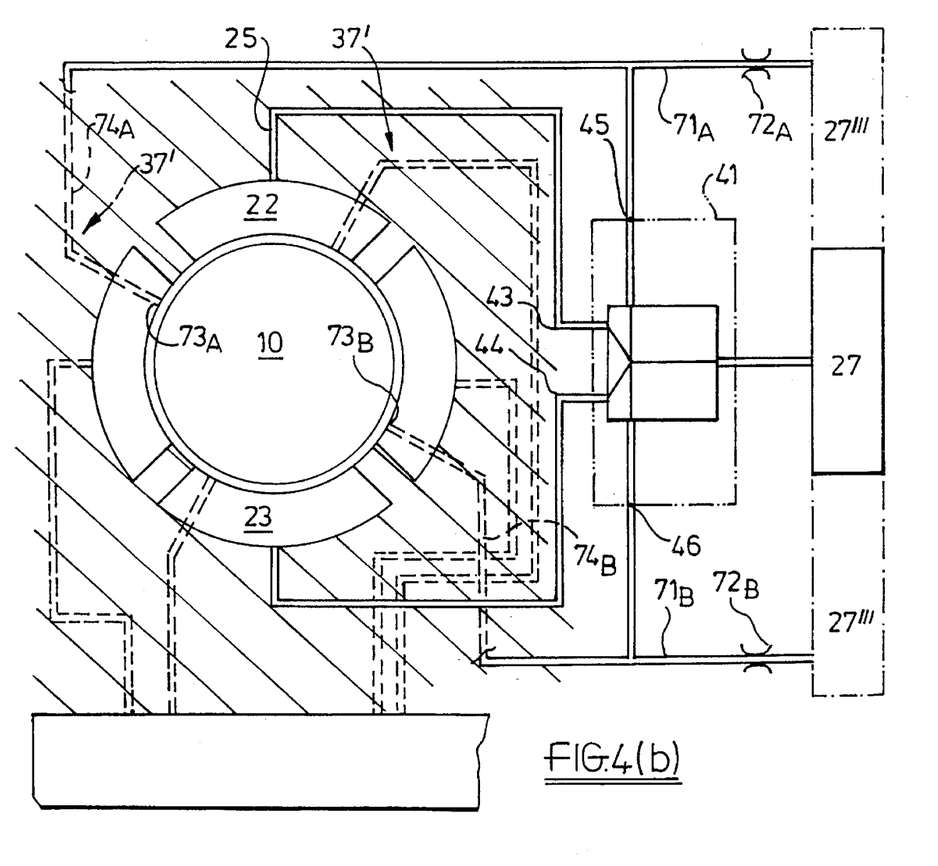

The above described embodiments all employ shaft displacement feedback means 37 which senses the pressure within sensing chambers as modulated by the approach or departure of the shaft to control the active gas flow controllers. FIGS. 4(a) and 4(b) show sectional and cross-sectional elevations similar to FIGS. 1(a) and 1(b) but with gas flow control means 28 comprising a second embodiment of shaft displacement feedback means indicated generally at 37' associated with a pair of gas controllers typified by controller 41 described in relation to FIG. 2. The shaft displacement feedback means, 37' comprises for each damping chamber 22 and 23 associated with the flow diverter 41, a control duct $71_A$, $71_B$ extending between the control input port 45, 46 respectively and supply 27 (or alternative supply 27''') preferably by way of a flow controlling orifice $72_A$, $72_B$. A leakage nozzle $73_A$ is disposed in the housing 12 adjacent the damping chamber 22 and opening into said clearance facing the shaft. In this example, the nozzle is sited at the lip 16 of the gas seal to have minimum separation from the shaft such that the nozzle has a flow rate dependant upon the separation of the shaft from the nozzle. The nozzle is also displaced circumferentially with respect to the centre of the chamber in a direction opposite to the rotation direction of the shaft such that the shaft approaches the nozzle in advance of approaching the associated chamber.

A leakage duct $74_A$ extends between the nozzle $73_A$ and the control duct $72_A$ such that the pressure of gas in the control duct and supplied to the control input 45 of the controller flip flop is a function of shaft displacement with respect to the nozzle by said varied leakage rate through the nozzle. A corresponding leakage nozzle $73_B$ and leakage duct $74_B$ controls leakage from control duct $72_B$ and control input 46 in antiphase with the nozzle $73_A$, in other respects operation being as described above.

All of the embodiments described above have, for simplicity and convenience been shown and described with orthogonally disposed pairs of oppositely disposed damping chambers, such arrangement facilitating the use of simply controlled self-powered devices and appropriate forms of shaft position feedback means in an arrangement of minimal axial extent and suitable for use within an existing gas seal housing.

It will be appreciated that a gas damping arrangement in accordance with this invention, and incorporating damping chambers arranged to substantially surround the shaft, may act as a gas seal by virtue of the continuous leakage therefrom of gas supplied by supply 27 and operate independently of any other form of gas seal.

Where the gas damping arrangement is not constrained axially to having all of a plurality of damping chambers and/or pressure sensing chambers within the single cross-sectional plane of FIGS. 1(a) and 1(b), circumferentially adjacent damping chambers may be offset axially, and possibly overlap circumferentially, and pressure sensing chambers may be defined separately from damping chambers, such pressure sensing chambers being possibly of lesser circumferential extent than the damping chambers and disposed in optimal circumferential positions with respect to the damping chamber or chambers with which associated, whether axially offset or not, in a manner corresponding to the disposition of leakage nozzles shown in FIG. 4(b).

Clearly, where it is possible to have shaft position feedback means which provides pressure control signals from leakage nozzles or pressure sensing chambers which are independent of damping chambers, then there is the possibility of using any number of damping chambers in odd or even numbers providing control is exerted by appropriately configured controllers to raise the pressure therein sequentially in advance of shaft approach.

Even in the arrangement described or detailed above and shown in FIG. 1(b), wherein the damping chambers are effectively confined to a single cross-sectional plane and also serve as pressure sensing chambers, alternative configurations are possible which permit wider control over the degree of plane advance and/or number of pressure sensing/damping chambers required.

For instance, the feedback duct 38 may be connected to damping chamber 23 as its sensing chamber and duct 39 to damping chamber 22 as its sensing chamber provided a suitable delay is introduced before the controllers response to supply gas to the associated chambers. Such an arrangement would function with one pair of chambers.

Alternatively, each feedback duct 38 and 39 could be connected to the same damping chamber to which gas is to be supplied, that is, 22 and 23 respectively, provided that each chamber is of sufficient circumferential length that a pressure change can be detected and the controller supply gas at a sufficient rate to develop damping pressure therein before the shaft is aligned with the centre of the chamber.

Clearly, if the pressure feedback is obtained from the same damping chamber to which gas is supplied and controlled each chamber and its controller act independently of any others and damping may be effected to some degree with as little as one damping chamber, provided that the gas flow controller can be switched between gas flow states.

It will also be appreciated that any of the above described arrangements of circumferentially arrayed damping chambers may be repeated at a plurality of axially separated sites to provide cumulative damping effects at sites where it is convenient to display such damping chambers or possibly accommodate sites specifically prone to vibrational disturbances.

As is well known in the art the fluidic devices suitable for controllers $35_A$ and $35_B$, slave controllers $51_A$ and $51_B$, and flip flops 41 and 61, as well as flow inductors $47_A$, $47_B$ or 48 and 49 if appropriate, may be implemented with no moving parts and it will be appreciated from the above described embodiments, therefore, that it is possible to provide an active damping arrangement for controlling radial shaft vibrations by alternately directing as flow using such fluid flow elements that involve no moving parts nor external control facilities, and to this end the gas flow control means be constructed with the damping chambers and ducts within a housing therefor. Furthermore, the flow boosting inductors or slave devices may be arranged to be supplied with gas (supplies 27' or 27") at a lower pressure than source 27 provides to the controller but at greater flow rates, possibly employing gas from the atmosphere within a closed housing when this is above ambient pressure.

Variations may be made to the forms of operation described for the various gas flow controllers. As described each pair of independent controllers, such as $29_A$ and $29_B$, are operated together in a bistable, flow diverting mode corresponding to flip flop 41, gas flow from each controlled output being inhibited by a signal causing a flow from an alternate controller. It will be appreciated that both such devices may alternatively be operated in a monostable mode by having one of the control inputs fed at a controlled pressure from the supply 27 (or an alternative) to default the controller device to a particular flow state unless it is overridden by a pressure feedback signal from the shaft displacement feedback means. Alternatively such devices may be operated in an astable mode, switching automatically at a predefined frequency related to the normal shaft rotation rate or vibration rate and synchronised as to phase, appropriately advanced, by suitable shaft displacement feedback means.

The fluid logic flip flop 41, for example may have its control input ports connected to each other to define an oscillator whose frequency is defined by the length and/or volume of the interconnecting line, such influencing parameters being controlled (possibly be magnetrorestrictive components) by some transducer which determines shaft vibration motion.

Shaft displacement feedback means may, instead of detecting changes in pressure as the shaft moves to and from a sensing chamber or nozzle, determine the position of the shaft with respect to the housing, and thus in relation to any damping chamber, measured by other sensing means, possibly associated with an actively controlled bearing arrangement and provide signals in forms suitable for direct or indirect control of the active controller devices.

Whereas the use of self-powered devices is convenient if such devices can be incorporated into the housing the control of gas flow may be achieved by active gas flow controllers other than self-powered fluidic devices, such as conventional valves requiring an external power source, and in such circumstances the feedback control signals may be provided other than by the chamber pressure and gas leakage monitored as described with respect to opposite damping chambers, and/or adapted for the above mentioned bistable, monostable as synchronised astable operation.

When employing gas flow controllers which may be integrated readily into the housing, the invention is not limited to gas flow control means employing active controllers of the type described above which have a gain factor and are controlled by shaft position feedback means which provide control signals to control inputs. The gas flow control means may comprise a direct acting form of gas control means as shown in FIG. 5.

Figure 5:
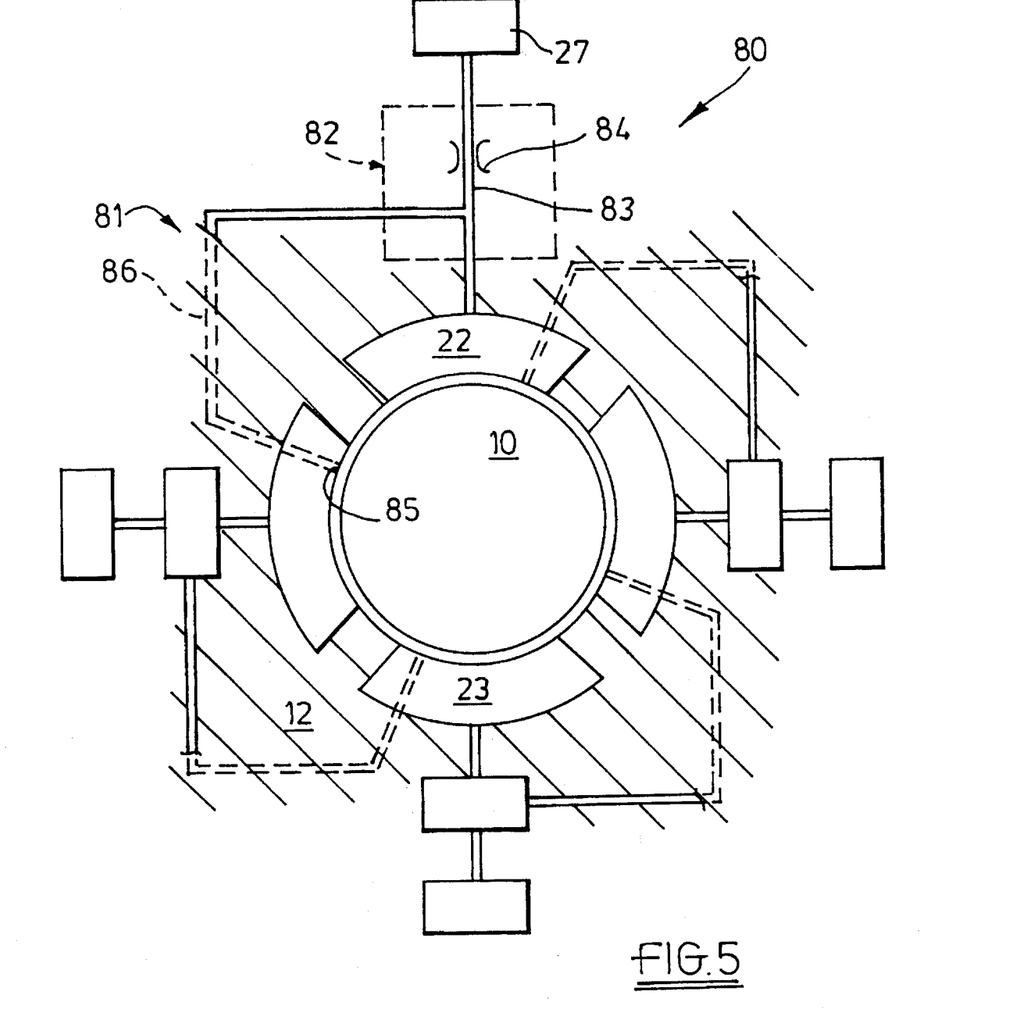
FIG. 5 is a schematic circuit diagram of a part of an alternative form of gas control means incorporating, for each of a pair of oppositely disposed damping chambers, a directly acting gas controller.

Referring to FIG. 5, a schematic view of a further arrangement 80 is shown. The shaft, housing, damping chambers supply and supply ducts substantially as shown in FIG. 1(a) and 1(b) and like references used. The gas flow damping means, designated generally at 81 comprises direct acting as flow controller for each damping chamber. For chamber 22, controller 82 comprises a control duct 83 extending between duct means 25 of damping chamber 22 and the gas supply 27, possibly by way of flow controlling isolating orifice 84, and supplies gas directly and continuously to the damping chamber. A leakage nozzle 85 is disposed in the housing 12 adjacent the damping chamber 22 and opens into said clearance facing the shaft, being sited conveniently at lip 16 of the gas seal to have minimum separation from the shaft. A leakage duct 86 extends between the nozzle 85 and the control duct 83 such that the pressure in the control duct, and thus the supply of gas to the damping chamber, is varied by leakage from the nozzle as a function of shaft displacement with respect to the nozzle. Thus as the shaft approaches the nozzle, and in advance of it approaching the centre of the damping chamber, gas leakage from the latter is impeded and pressure increases within the damping chamber to provide the damping effect described hereinbefore.

Such arrangement is not limited by the number of damping chambers arranged about the shaft and may provide some degree of damping with any number of such chambers arranged in a single cross-sectional plane or axially displaced.

As mentioned hereinbefore, whereas the damping arrangement may take on forms suitable for combining with a gas seal structure in which there is not only a continuous flow of gas through the arrangement axially (which may conveniently, but not necessarily, be provided by source 27) but in which the damping chambers also fulfil a role within the gas seal with their locations and alternating changes in pressure as gas is ducted thereto, it may act also as a gas seal by virtue of its own structure of chambers surrounding the shaft and a constant leakage of gas therefore via the restrictions formed by chamber walls defining only a small clearance from the shaft.

The radial damping arrangement may be provided separately from any gas sealing function although the gas leaking from the damping chambers along the clearance between shaft and housing may perform a cooling function to other components, such as bearings mounted between the shaft and housing. Because the damping arrangement, insofar as it interfaces between the rotating shaft surface and the housing, comprises circumferentially bounded damping chambers, such chambers may be combined with elements of a bearing such as a magnetic bearing or hydrostatic gas bearing; in the latter case a positive pressure developed in the damping, and possibly other, chambers to effect shaft support being modulated by the gas flow control means with the correct phase relationship in response to detected shaft disturbances to effect damping thereof.

Figure 6:
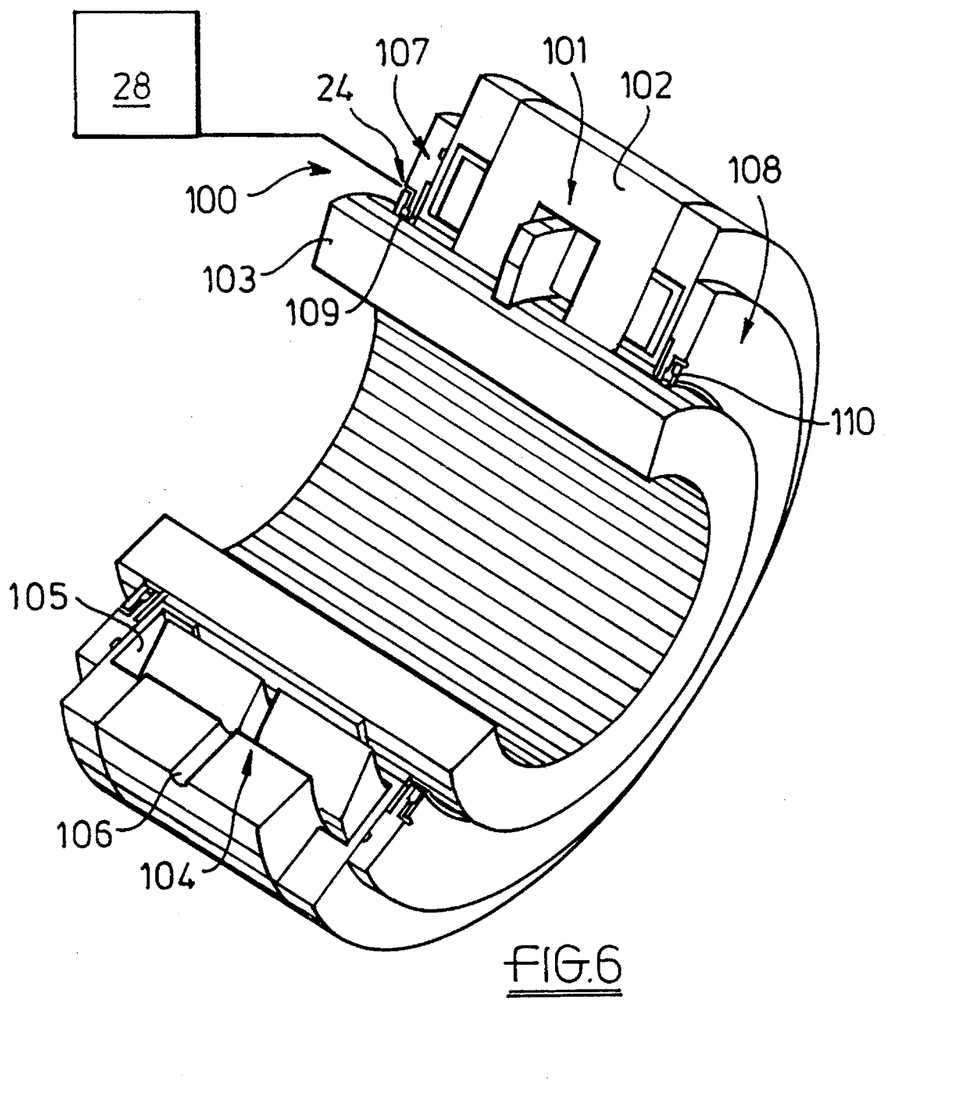
FIG. 6 is a partly cut away perspective view of a combined magnetic bearing and gas bearing incorporating a radial gas damping arrangement in accordance with the present invention.

Referring to FIG. 6 which shows a partly cut away view of a combined magnetic and gas bearing 100, the magnetic baring 101 comprises a shaft encircling stator 102 and a rotor 103 adapted to be formed in, or surround the shaft 102. Integrated therewith is a gas bearing indicated generally at 104 incorporating an annular chamber 105 opening towards the rotor 103 and an inlet port 106. As shown gas seals 107, 108 incorporating a gas damping arrangement as described herein are disposed at each axial end of the stator 101/gas chamber 105. The damping arrangement comprises a plurality of damping chambers 109, 110 etc. arranged about the longitudinal axis and connected by duct means 24 to gas flow control means 28 as described hereinbefore, or any variants thereof.

The gas bearing may comprise a continuous annular chamber 105 extending about the shaft to provide uniformly radially directed support for the shaft, possibly in a back-up capacity and operated upon failure of the magnetic bearing, with damping provided by the arrangements 107, 108 alone. Alternatively the chamber 105 may be divided into discrete chambers of limited circumferentially extent, all of which are coupled to individual supplies of gas at elevated pressure to provide support with at least some of the chambers and supply ducts comprising a radial damping arrangement as described hereinbefore.

It is to be understood that a damping arrangement in accordance with the present invention may be employed for such damping purpose alone and separately from combination with any other device, such as a gas seal or bearing, and to perform its function will then be of such a structure that it provides or has specifically provided for use therewith a housing, containing the damping and any other chambers, through which the shaft extends.

It will be appreciated that other variations may be made to the above described embodiments without departing from the scope of the invention.

Whereas the degree of phase advancement may be determined by gas supply pressure and supply rate and the relative disposition of damping chambers and shaft position feedback means, it may also be adjusted by making the volumes of damping chamber variable by having at least one wall thereof adjustable in position or the chamber volume adjustable by means of a tuning screw or stub.

We claim:

1. A radial vibration damping arrangement for a rotor shaft extending through a housing and spaced therefrom by a clearance, said arrangement comprising damping chamber means defined in the housing comprising at least one damping chamber open towards the shaft and partially surrounding the shaft between bounding walls, at least one supply of gas at elevated pressure, gas duct means opening into each said chamber and gas flow control means operable to provide a positive pressure within the damping chamber means acting radially on the shaft and comprising, for each damping chamber, a flow controller responsive to reciprocation of the shaft to and from the housing to modulate the supply of gas to the damping chamber by way of the duct means, and thus the pressure therein, at the same frequency as the shaft reciprocation and advanced in phase with respect to variations in shaft position relative to the chamber within a predetermined frequency range to effect a corresponding variation in radial thrust on the shaft and damping of said shaft radial reciprocation.

2. An arrangement as claimed in claim 1 in which the flow control means comprises shaft displacement feedback means and, for each damping chamber, an active flow controller having an input port connected to a said at least one supply, an output port connected to the gas duct means of the chamber and at least one control input connected to receive signals from the shaft displacement feedback means to effect control of gas flow between said supply and duct.

3. An arrangement as claimed in claim 2 in which the active gas flow controller comprises a self powered device responsive to gas pressure at each control input and the shaft displacement feedback means is arranged to provide a gas pressure to the control input as a function of shaft displacement with respect to said associated chamber.

4. An arrangement as claimed in claim 3 in which the shaft displacement feedback means comprises for each chamber and its associated controller a feedback duct extending between said controller input and a pressure sensing chamber displaced circumferentially from said chamber in advance thereof in the direction of shaft rotation.

5. An arrangement as claimed in claim 4 in which at least one pressure sensing chamber comprises a damping chamber.

6. An arrangement as claimed in claim 3 in which the shaft displacement feedback means comprises for each chamber a feedback duct extending between the associated controller control input and the chamber operable to provide a gas pressure to the controller as a function of gas pressure, and thus shaft position with respect to, said chamber.

7. An arrangement as claimed in claim 6 in which the leakage nozzle is disposed to open into said clearance at a position circumferentially displaced from said chamber in advance thereof in the direction of shaft rotation.

8. An arrangement as claimed in claim 3 in which the shaft displacement feedback means comprises a control duct extending between the control input and a said at least one supply of gas and a leakage nozzle disposed in said housing and opening into said clearance facing the shaft, the nozzle having a leakage rate dependent upon separation of the shaft from the nozzle, and a leakage duct extending between said orifice and control duct operable to vary the pressure of the supply to said controller control input as a function of shaft displacement with respect to the nozzle.

9. An arrangement as claimed in claim 2 in which the active flow controller comprises a plurality of flow control devices connected in tandem, there being a master device and at least one slave device, each device having input, output and control ports, said master device having the input port thereof connected to said supply and comprising the input port of the flow controller, each control port connected to said shaft displacement feedback means and output port connected to the control port of the first slave device, the output port of each slave device being connected to the control input port of the next slave device and the output port of the last slave device providing the output of the flow controller.

10. An arrangement as claimed in claim 1 in which the damping chamber means comprises at least a pair of diametrically opposed damping chambers and each gas flow controller comprises a common gas flow diverter operable to control the flow of gas to each of said chambers of the pair alternately.

11. An arrangement as claimed in claim 10 in which the gas flow diverter includes at least one fluid logic flip flop having a pair of output ports connected one each to said damping chambers of the pair by way of said gas duct means.

12. An arrangement as claimed in claim 1 in which each gas flow controller has in line with its associated damping chamber a flow inductor comprising an inductor output port coupled to said duct means, an inductor main input port coupled to a said gas supply and an inductor control input port coupled to receive said modulated gas, said flow inductor being operable to combine the gas flows at said inductor input ports to provide at the inductor output port a boosted gas flow modulated in accordance with the modulation at the inductor control input port.

13. An arrangement as claimed in claim 1 in which the gas flow control means comprises for each damping chamber a direct acting flow controller including a controller duct extending between the damping chamber and said gas supply, and a leakage nozzle disposed in said housing and opening into said clearance facing the shaft, the nozzle having a leakage rate dependant upon separation of the shaft from the nozzle, and a leakage duct extending between said nozzle and controller duct operable to vary the gas pressure in said controller duct, and thus the supply of gas to the damping chamber, as a function of shaft displacement with respect to the nozzle.

14. An arrangement as claimed in claim 13 in which the leakage nozzle is disposed to open into said clearance at a position circumferentially displaced from said chamber in advance thereof in the direction of shaft rotation.

15. An arrangement as claimed in claim 14 in which said phase advance is substantially 90 degrees.

16. A combination as claimed in claim 15 in which at least one supply of damping gas comprises the supply of seal gas.

17. An arrangement as claimed in claim 1 in which all of the chambers arranged about the shaft are contained substantially in the same cross sectional plane.

18. An arrangement as claimed in claim 1 in which each damping chamber extends circumferentially of the shaft to subtend an angle of substantially 90 degrees at the rotational axis of the shaft.

19. An arrangement as claimed in claim 1 in which said gas supply modulation is advanced in phase between 135 degrees and 0 degrees with respect to said shaft vibration.

20. An arrangement as claimed in claim 1 in which the gas flow control means and duct means are contained within the housing.

21. A bearing for a rotor shaft extending through a housing and spaced therefrom by a clearance including a radial vibration damping arrangement comprising damping chamber means defined in the housing comprising at least one damping chamber open towards the shaft and partially surrounding the shaft between bounding walls, at least one supply of gas at elevated pressure, gas duct means opening into each said chamber and gas flow control means operable to provide a positive pressure within the damping chamber means acting radially on the shaft and comprising, for each damping chamber, a flow controller responsive to reciprocation of the shaft to and from the housing to modulate the supply of gas to the damping chamber by way of the duct means, and thus the pressure therein, at the same frequency as the shaft reciprocation and advanced in phase with respect to variations in shaft position relative to the chamber within a predetermined frequency range to effect a corresponding variation in radial thrust on the shaft and damping of said shaft radial reciprocation.

22. A bearing as claimed in claim 21 in which the radial vibration damping arrangement is disposed with respect to the bearing such that gas leakage from each said damping chamber comprises cooling gas for the bearing flowing axially of the shaft.

23. A bearing as claimed in claim 21 comprising a gas bearing including a plurality of pressure chambers arranged about the shaft and at least some of which are common with damping chamber of the damping arrangement.

* * * * *